United States Patent [19]
Bond

[11] Patent Number: 5,491,716
[45] Date of Patent: Feb. 13, 1996

[54] WEIGHT-VALUE CONTROLLED ADAPTIVE PROCESSOR FOR SPREAD SPECTRUM RECEIVER

[75] Inventor: James W. Bond, San Diego, Calif.

[73] Assignee: The United States of America as represented by the Secretary of the Navy, Washington, D.C.

[21] Appl. No.: 563,907

[22] Filed: Jun. 18, 1990

[51] Int. Cl.⁶ .............................. H04B 1/69; H04B 1/10
[52] U.S. Cl. ........................ 375/200; 455/218; 455/222; 455/226.1; 455/226.2; 455/226.3
[58] Field of Search .......................... 375/1, 200–210; 333/166; 455/183, 218, 222, 226, 277, 278, 283, 295, 296, 303, 306, 307, 183.1, 183.2, 226.1–226.4, 277.1–277.2, 278.1, 247.1, 247; 375/200–210

[56] References Cited

U.S. PATENT DOCUMENTS

| | | | |
|---|---|---|---|
| 879,409 | 2/1908 | Pierce | 375/99 |
| 3,596,184 | 7/1971 | Hanus et al. | 455/222 X |
| 3,624,562 | 11/1971 | Fujimura | 333/166 X |
| 3,660,765 | 5/1972 | Glassser et al. | 455/247 |
| 3,988,679 | 10/1976 | Clarke et al. | 455/306 |
| 4,304,004 | 12/1981 | Von Der Neyen | 375/88 |
| 4,358,738 | 11/1982 | Kahn | 328/165 |
| 4,398,296 | 8/1983 | Gott et al. | 375/1 |
| 4,654,884 | 3/1987 | Sakai et al. | 455/183 |

OTHER PUBLICATIONS

Sollfrey, "Hard Limiting of Three and Four Sinusoidal Signals", Jan 1969, pp. 2–7, *IEEE Transactions on Information Theory*, vol. IT–15, No. 1.
Jain, "Limiting of Signals in Random Noise", May 1972, p. 332, *IEEE Transactions on Information Theory*, vol. IT–18, No. 3.
Jones, "Hard–Limiting of Two Signals in Random Noise", Jan., p. 34, *IEEE Transaction on Information Theory*.
Shaft, "Limiting of Several Signals and Its Effect on Communication System Performance", Dec. 1965, p. 504, *IEEE Transactions on Information Theory*, vol. COM–13, No. 4.

*Primary Examiner*—Bernarr E. Gregory
*Attorney, Agent, or Firm*—Harvey Fendelman; Thomas Glenn Keough

[57] ABSTRACT

An adaptive processor for a spread spectrum receiver utilizes an adaptive Wiener filter and an adaptive limiter-canceller in tandem and in conjunction with bypass controls. The adaptive processor derives its cancelling signals from the primary signal. The adaptive processor makes use of bypass switches connected to the adaptive Wiener filter and adaptive limiter-canceller and activated by internally generated control signals to switch the adaptive Wiener filter and adaptive limiter-canceller in or out of the signal processing path.

10 Claims, 2 Drawing Sheets

5,491,716

WEIGHT-VALUE CONTROLLED ADAPTIVE PROCESSOR FOR SPREAD SPECTRUM RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to adaptive signal processing techniques and, more particularly, to an adaptive processor for a spread spectrum receiver using an adaptive Wiener filter and an adaptive limiter-canceller in conjunction with bypass controls.

A spread spectrum receiver typically extracts transmitted information from a radio frequency signal which consists of the signal with the information, other structured signals (called interference) and atmospheric noise arising from lightning discharges. Adaptive processors cancel the interference. However, in some cases they cancel the signal carrying the information.

The simplest approach to applying adaptive signal processing techniques to the improvement of a VLF spread-spectrum receiver in the presence of strong interfering signals is to implement the techniques within the receiver without the derivation of the interference cancelling signal by itself from an external source. Interference arises from other communication signals being broadcast and from deliberate attempts to prevent reception through the generation of jamming signals.

There are two distinct approaches to cancelling interference. One approach is the use of an adaptive Wiener filter and a time-delayed version of the primary signal as a cancelling signal. This approach only cancels interference consisting of tones. The other approach is the use of an adaptive limiter-canceller and a hard-limited bandpassed version of the primary signal as a cancelling signal. This approach cancels more complicated interference than tones.

Both of these approaches suffer from the drawback that under certain conditions they can cancel the desired signals. However, under certain other conditions both cancel interfering signals which provides significant performance improvements.

SUMMARY OF THE INVENTION

The present invention provides an adaptive processor for a spread spectrum receiver which utilizes an adaptive Wiener filter and an adaptive limiter-canceller in tandem and in conjunction with bypass controls. Prior to this invention, there has been no technique of using these two components together in an adaptive signal processor so that, together, better performance can be achieved than can be achieved using either alone while preventing performance degradation.

The invention solves the major shortcoming of adaptive processors which derive their cancelling signals from the primary signal, namely that they can partially cancel the desired signal under certain conditions. The invention makes use of bypass switches activated by control signals generated from comparing simple functions of the adaptive weights with other quantities, as contrasted with prior systems which do not include effective techniques based on internal monitoring of the adaptive processes to bypass the processes when they are not cancelling interference.

This solution is accomplished in the present invention by the novel use of bypass switches controlled by internally generated control signals in addition to external operator control which allows the adaptive processor to be bypassed. In addition, it is accomplished by novel techniques for deriving the internal control signal so that the overall principle of operation of the adaptive processor of the present invention is different than previous adaptive processors suggested for use in spread-spectrum receivers. Further, the present invention accomplishes this solution through a novel combination that utilizes known adaptive Wiener filtering and adaptive limiter-cancelling as well as through the use of other known receiver components.

OBJECTS OF THE INVENTION

Accordingly, it is the primary object of the present invention to disclose an improvement of communication signal reception of a spread-spectrum receiver in the presence of strong interfering signals while avoiding the cancellation of the desired signal.

Another object of the present invention is to disclose an adaptive processor which derives the interference cancellation signal from the primary signal within the receiver.

Still another object of the present invention is to disclose an adaptive processor for a spread spectrum receiver utilizing an adaptive Wiener filter and an adaptive limiter-canceller in conjunction with bypass switches and controls.

A further object of the present invention is to disclose an adaptive processor which utilizes two bypass switches controlled by internally generated control signals in addition to manual operator control to permit the adaptive processor to be bypassed.

A still further object of the present invention is to disclose an adaptive processor which can be used in a VLF receiver and also in other communication receivers, for example, in LF and ELF receivers.

Other objects, advantages and novel features of the invention will become apparent from the following detailed description of the invention when considered in conjunction with the accompanying drawings.

DETAILED DESCRIPTION OF THE INVENTION

Figure 1:
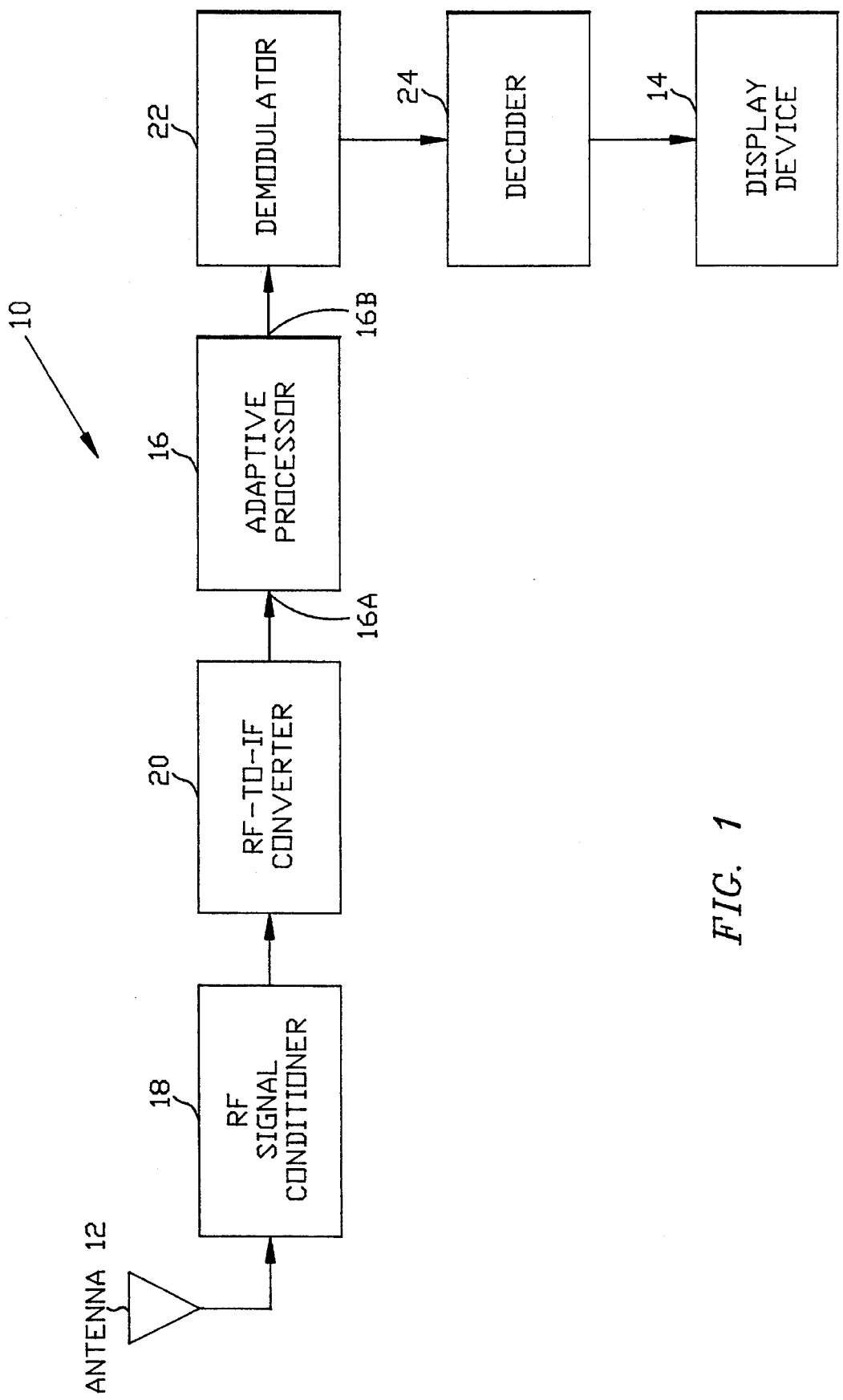
FIG. 1 is a block diagram of a spread spectrum receiver in which is employed an adaptive processor of the present invention.

Referring now to the drawings, and particularly to FIG. 1, there is shown a VLF spread spectrum receiver, generally designated 10, which is connected between an antenna 12 and a display device 14. Receiver 10 incorporates an adaptive processor 16 constructed in accordance with the principles of the present invention. In addition to adaptive processor 16, spread spectrum receiver 12 includes RF signal conditioner 18 and RF-to-IF converter 20 connected in series between antenna 10 and input 16A of adaptive processor 16, and a demodulator 22 and decoder 24 connected in series between display device 14 and output 16B of adaptive processor 16.

Figure 2:
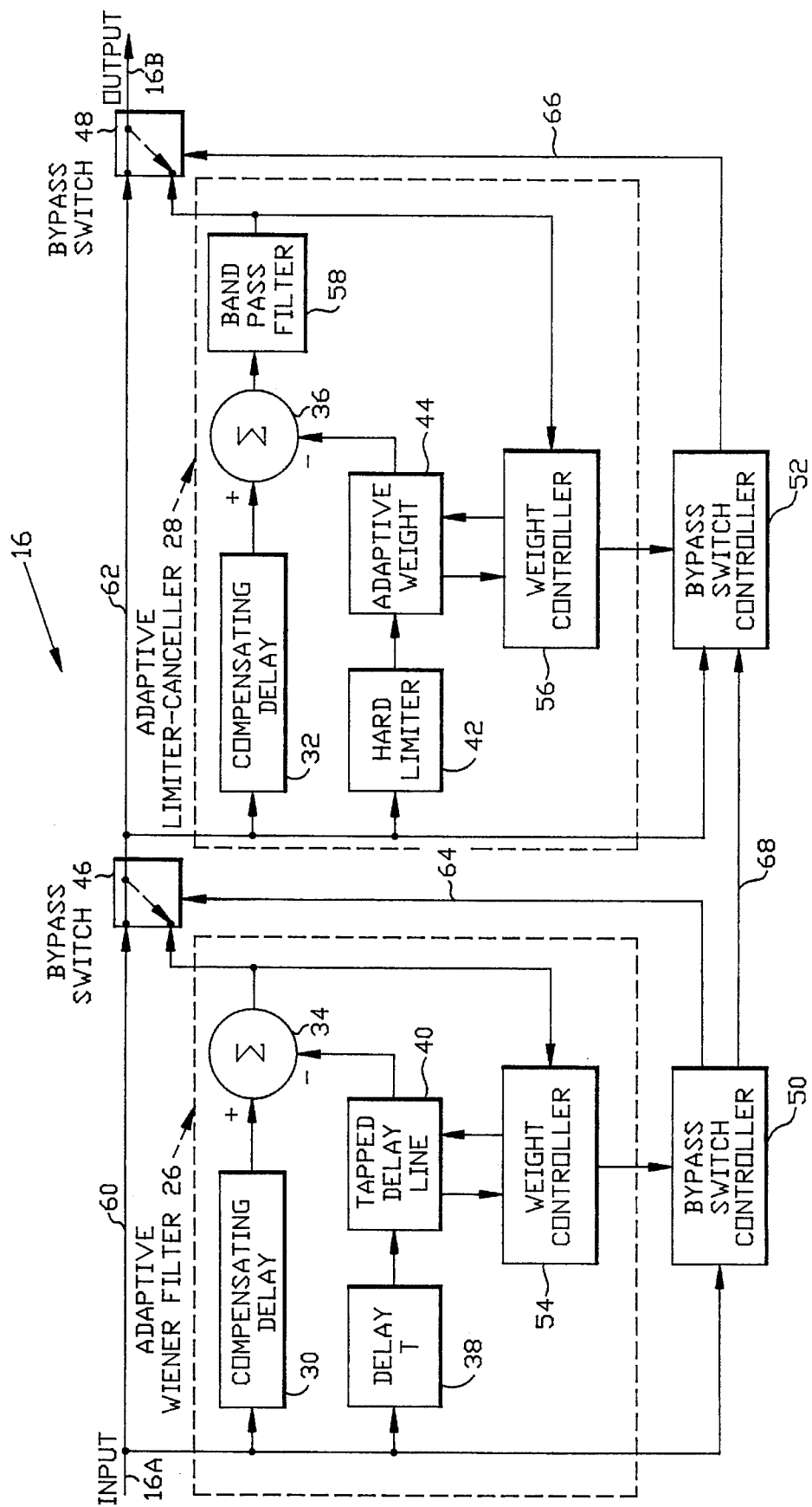
FIG. 2 is a detailed block diagram of the adaptive processor of the present invention employed in the receiver of FIG. 1.

Referring to FIG. 2, adaptive processor 16 of the present invention includes adaptive Wiener filter 26 and adaptive limiter-canceller 28 which are conventional individually. Adaptive Wiener filter 26 and limiter-canceller 28 contain respective compensating delays 30 and 32 in the path of the primary signals from input 16A of adaptive processor 16 to the inputs, labelled with "+" signs, of summers 34 and 36. The adaptive processor 16 sums the difference between the received signal called the primary signal and a time delayed replica of the received signal called the secondary signal. These compensating delays 30 and 32 have values chosen to compensate for phase shifts between the primary and secondary signals so that cancellation will be optimum. Further, T delay 38 in adaptive Wiener filter 26 creates the secondary signal fed into a standard tapped delay line 40 with adaptable weights by saving the primary signal from the past period of T seconds. Hard limiter 42 and adaptive weight 44 in adaptive limiter-canceller 28, which replaces a real-valued positive number with +1, 0 with O, and a real-valued negative number with −1, creates the secondary signal for adaptive limiter-canceller 28.

For adaptive Wiener filter 26 and limiter-canceller 28, the secondary signals to the inputs, labelled with "−" signs, of summers 34 and 36 are subtracted from the primary signals by summers 34 and 36. Weights are chosen in an attempt to minimize the energy (power) of the signals coming out of summers 34 and 36.

In accordance with the principles of the present invention, adaptive processor 16 also includes bypass switches 46 and 48 and bypass switch controllers 50 and 52. The bypass switch controllers 50 and 52 are coupled to respective bypass switches 46 and 48 and respective weight controllers 54 and 56 in adaptive Wiener filter 26 and adaptive limiter-canceller 28 of the adaptive processor. Summers 34 and 36 are connected to respective bypass switches 46 and 48 and weight controllers 54 and 56. Bandpass filter 58 is connected to summer 36 and also to bypass switch 48 and weight controller 56. Conductor leads 60 and 62 also interconnect adaptive processor input 16A and output 16B and bypass switches 46 and 48 for permitting adaptive processor 16 to be bypassed when switches 46 and 48 are closed in response to control signals generated by adaptive Wiener filter 26 and adaptive limiter-canceller 28. The control signals are transmitted from weight controllers 54 and 56 on conductor leads 64 and 66 to bypass switches 46 and 48 via bypass switch controllers 50 and 52. Also, conductor lead 68 extends directly from bypass switch controller 50 to bypass switch controller 52.

Basically, in operation, the input to adaptive processor 16 is presumed to be composed of components of the desired communication signal, interfering signals, and noise. Adaptive processor 16, having the above-described construction, is designed to output a signal with the communication signal component intact, the interfering signal component repressed, and noise component essentially unaltered. Adaptive processor 16 also generates certain control signals which cause switching of bypass switches 46 and 48 to the solid line bypass positions seen in FIG. 2 to permit bypassing of the processor 16 if other than spread spectrum signals are being received. Certain other control signals are generated which cause switching of bypass switches 46 and 48 to the dotted line series positions seen in FIG. 2 depending on whether receiver synchronization has been achieved or not. In addition, adaptive processor 16 is connected to an external switch (not shown) so that an operator can switch the adaptive processor out of the receiver 10 when the communication signal is being received without interference.

More particularly, communication signal s(t) has the following properties relevant to the description of the invention: (a) it is a psuedo-random signal whose most primitive signaling units are chips of duration T (a "chip" is the minimal time during which the transmitted communication signal has the same frequency); and (b) the autocorrelation function for the psuedo-random sequence of chips has a zero-delay value several hundred times its value for any non-zero delay. The interfering signal j(t) has the following properties relevant to the description of the invention: (a) it is uncorrelated with the signal, unless it is a reflection in which case it is correlated with an earlier portion of the signal; and (b) it is in the radio frequency band of the communication signal. The noise signal n(t) has the following properties relevant to the description of the invention: (a) it is uncorrelated with the signal; and (b) it is uncorrelated with the interfering signal j(t).

The input to adaptive processor 16 may be described as a vector:

f=(f(t1), f(t2), . . . , f(tN)) with f denoting the received signal and with tN−t1=T and t(i+1)− ti=a constant for i=2, 3, . . . , N.

This vector can be written as a sum of signals, interferers and noise n as follows:

f=s+j+n with
s=(s(t1), s(t2), . . . , s(tN))
j=(j(t1), j(t2), . . . , j(tN))
n=(n(t1), n(t2), . . . , n(tN))

Here f(ti)=s(ti)+j(ti)+n(ti) which have inphase and quadrature components represented as the real and imaginery parts of a complex number.

For any vector:
g=(g1, g2, . . . , gN),
we define in the usual manner:

$$\|g\| = \sum_{i=1}^{N} (gi) * (gi),$$

complex conjugate of a complex number.

For any pair of vectors:
g=(g1, g2, . . . , gN) and
h=(h1, h2, . . . , hN)
we define in the usual manner the dot product:

$$g \cdot h = \sum_{i=1}^{N} (gi) * (hi) \text{ and the convolution}$$

$$g*h = (g*h1, g*h2, \ldots, g*hN) \text{ with}$$

$$g*hk = \sum_{i=1}^{N} (gi)(h(k-i)) \; k=1, 2, \ldots, N$$

and the convention that:

h(k−i)=hk^ if (k−i)−k^ is a multiple of N.

For g=f, s, j, and n, we define a time-delayed version of the functions by:

gT=(g(t1-T), g(t2-T), . . . , g(tN-T).

Using the above-defined notation it is easy to characterize adaptive Wiener filter 26 for the purpose of describing the invention. If adaptive Wiener filter 26 of FIG. 2 converges, its weight vector:

w=(w1, w2, . . . , wN)

has the property:

$\|f-w^*fT\|$ is minimal.

Let $f=w^*fT+e$. The vector e must be perpendicular to $w^*fT$ for:

$\|f-w^*fT\|$ to be minimal.

This means that:

$$\|f\|^2 = \|w^*fT\|^2 + \|e\|^2.$$

This equation is the basis for controlling the operation of bypass switch 46 of adaptive Wiener filter 26. Note that the vector e has a component consisting of the signal because it is not correlated with fT. If $\|e\|$ is small relative to $\|f\|$, then two things must be true: (a) f contains a significant component of either the interferer or communication signal; and (b) the signal $w^*fT$ has successfully cancelled the non-signal component or components of f. This translates into the adaptive processor bypass control criteria:

(a) If $\|w^*fT\| >$ or $=k \|f\|$ for k a constant in the range ½ < or $=k<$ or $=9/10$, then adaptive Wiener filter 26 is successfully cancelling and
  (1) send a control signal to adaptive Wiener filter bypass switch 46 which switches adaptive Wiener filter 26 into the signal processing path,
  (2) send a second control signal to the limiter-canceller bypass switch 48 which switches adaptive limiter-canceller 28 out of the signal processing path (because it is not needed).

If $\|w^*fT\| < k\hat{}\|f\|$ for $k\hat{}$ a second constant in the range ⅛ < or $=k<$ or $=½$, then adaptive Wiener filter 26 is not successfully cancelling a significant non-signal component and send a control signal to adaptive Wiener filter bypass switch 46 which switches adaptive Wiener filter 26 out (because partial cancellation by it reduces the effectiveness of adaptive limiter-canceller 28).

The weight vector w can be calculated using any of the standard algorithms known to one skilled in the art. Different algorithms for calculating the weight vector lead to different filter convergent times. The above two criteria would not be applied after every weight update, but at particular times when it is logical to switch adaptive Wiener filter 26 or adaptive limiter-canceller 28 in or out given subsequent receiver processing. This point will be returned to after the following description of the control of the limiter-canceller bypass switch 48.

The limiter-canceller works because a hard-limiter followed by a bandpass filter emphasizes the strongest input signal (the interfering signal) relative to the weakest signal (the communication signal). In particular, (a) If the input to the hard-limiter followed by ideal bandpass filter contains a single dominant signal among other signals, then the power of the dominant signal will be enhanced by about 6 dB at the output of the device relative to the other signals (i.e. its amplitude will be increased by a factor of two relative to the amplitudes of the other signals);

(b) If the input to the hard-limiter followed by ideal bandpass filter contains two equal amplitude dominant signals among other signals, then their power may be reduced by up to 3 dB at the output of the device relative to the other signals.

This means that the weight of adaptive limiter-canceller 28 takes on different values when the adaptive limiter-canceller is cancelling an interferer successfully or not. These different values of the weight are used for controlling bypass switch 48 of adaptive limiter-canceller 28 along with the control signal sent by adaptive Wiener filter 26. Details follow.

Let $g=(g(t1), g(t2), \ldots, g(tN))$ denote the output of adaptive Wiener filter bypass switch 46 in FIG. 2 (g can also be characterized as the input to adaptive limiter-canceller 28).

Let $h=(h(t1), H(t2), \ldots, h(tN))$ denote the normalized output of hard-limiter 42 followed by ideal bandpass filter 58.

If $h\hat{}$ is an output of hard-limiter 42 followed by ideal bandpass filter 58, then $h=(\|g\|/\|h\|)h\hat{}$.

Let w denote single adaptive weight 44 of adaptive limiter-canceller 28. Then if convergence of adaptive limiter-canceller 28 occurs, $\|g-wh\|$ is minimal.

Property (a) of hard limiter 42 followed by ideal bandpass filter 58 translates into the condition:

$w\|g\|/\|h\hat{}\|$ approximately equals ½ when adaptive limiter-canceller 26 is cancelling an interferer as desired. For other cases:

$w\|g\|/\|h\hat{}\|$ approximately equals 1.

These theoretical results are the basis for controlling adaptive limiter-canceller bypass switch 48:

send a signal to limiter-canceller bypass switch 48 which switches the limiter-canceller out whenever: $w\|g\| >$ or $=k^*\|h\hat{}\|$ for a constant $k^*$ with:

½ < or $=k^*<$ or $=⅞$ (nominal value for $k^*= ¾$).

Limiter-canceller bypass switch 48 is controlled by the above control signal and by the control signal, already described earlier, generated by adaptive Wiener filter 26. Switch 48 is bypassed if adaptive Wiener filter 26 successfully cancels the interferer or if adaptive limiter-canceller 28 is not cancelling a high-powered interferer.

The overall operation of adaptive processor 16 will now be described. Referring first to FIG. 1, the output of RF-to-IF converter 18 is assumed to consist of complex-valued samples of a time varying signal. All the vectors which have been under discussion consist of complex numbers, viewed as samples of time varying in-phase and quadrature components of signals at discrete times. Adaptive processor 16 can be implemented in digital hardware and its output consists of complex numbers which are viewed as complex-valued samples of the time-varying output of the adaptive processor. The output complex numbers are made to look like the input numbers to adaptive processor 16 so that the other components of VLF receiver 10 need not be redesigned to allow incorporation of the invention. Control signals to allow adaptive processor 16 to be turned off by the operator or its operation to be modified during synchronization are obtained from appropriate points (not shown) within the receiver.

The basic operation of adaptive processor 16 proceeds as follows. After each "chip" is received, the weights of adaptive Wiener filter 26 and adaptive limiter-canceller 28 are updated. The sampling rate is greater than the symbol rate so that many signal samples are associated with each symbol. If synchronization has not occurred, then the control signals to bypass switches 46 and 48 are sent every 10 chips (for practical spread spectrum receivers more than 10 chips would be involved in a block corresponding to the transmission of information concerning a transmitted symbol). After synchronization has occurred the bypass control signals are generated.

From the above description, it can be realized that adaptive processor 16 of the present invention derives the interference cancellation signal from the primary signal within receiver 10. The primary signal is the output of RF-to-IF converter 20 and the output of adaptive processor 16 has the same structure as the primary signal except that interfering signals have been attenuated. Adaptive processor 16 can therefore be readily incorporated into existing receivers if there is any spare computational capability associated with the microprocessors of the receivers.

Additionally, adaptive processor 16 of the invention solves the major shortcoming of adaptive processors which derive their cancelling signals from the primary signal, namely that they can partially cancel the desired signal under certain conditions. This shortcoming is solved through the use of bypass switches 46 and 48 activated by control signals generated from comparing simple functions of the adaptive weights with other quantities. The adaptive processor of the invention exceeds the performance provided by any previous independent or combined use of adaptive Wiener filters and adaptive limiter-cancellers.

Adaptive processor 16 can also be used in other communication receivers, for example, in LF and ELF receivers. Further, it can be used prior to RF-to-IF converter 20 in communication receiver 10.

With the exception of adaptive processor 16, the components of receiver 10 are conventional and well known in construction and operation and need not be described in detail for gaining an understanding of the present invention. Modern receivers are tuned to the broadcast frequency and are designed to reject interference which does not fall within the bandwidth of the broadcast signal. The preprocessing is designed to internally adjust the received signal level and mix it down to a lower frequency before converting it from an analog signal to discrete samples represented digitally. These digital samples are processed by the invention to remove the interference from the desired signal. All the components of the invention then are hosted by the digital signal processors within the receiver 10. Typically the adaptive Wiener filter 26 and limiter-canceller 28 would be implemented using digital signal processing modules under the control of a general purpose microprocessor which controls the overall use of processing assets within the receiver 10 and the passing of data and control signals between them through the use of a bus architecture. The bypass switch controllers 50 and 52 and bypass switches 46 and 48 would be implemented within the general purpose microprocessor. In some cases, it may be necessary to change the existing processor cards by the inclusion of leads to carry information from some processor component to another depending on the flexibility of the receiver hardware as determined by the available interconnections between the general purpose microprocessor and the digital processing modules.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. An adaptive processor for a spread spectrum receiver, said adaptive processor having an input and an output and a conducting path connecting said input and said output, said adaptive processor comprising:

(a) a bypass switch connected in said conducting path between said input and said output of said processor and having first and second switched positions; and (b) means connected between said input and said bypass switch for receiving and processing an input signal which contains communicating and interfering signal portions and for outputting to said bypass switch a signal having a reduced interfering portion, said input signal receiving and processing means also for producing a control signal having a first state if said interfering signal portion is being successfully reduced and a second state if said interfering signal portion is not being successfully reduced;

(c) a bypass switch controller connected to said input, said input signal receiving and processing means, and said bypass switch, said bypass switch controller for receiving said control signal from said input signal receiving and processing means and for activating said bypass switch to its first or second switched position to correspondingly connect said input signal receiving and processing means in or out of said conducting path to said output depending upon whether said control signal is in said first or second state.

2. The processor of claim 1 wherein said input signal receiving and processing means is an adaptive Wiener filter.

3. The processor of claim 1 wherein said input signal receiving and processing means is an adaptive limiter-canceller.

4. The processor of claim 1 wherein said input signal receiving and processing means includes:

first means connected to said input for receiving said input signal and processing said input signal by reducing narrowband interference therein and for producing a processed input signal;

second means connected to said input for receiving said input signal and producing an intermediate signal therefrom;

third means connected to said first means and said second means for receiving said processed input signal and said intermediate signal and combining them together in order to reduce said interfering signal portion of said input signal and generate an output signal; and fourth means connected to said second means and said third means for receiving said intermediate signal and said output signal and producing said control signal.

5. An adaptive processor for a spread spectrum receiver, said adaptive processor having an input and an output and a conducting path connecting said input and said output, said adaptive processor comprising:

(a) a bypass switch connected in said conducting path between said input and said output of said processor and having first and second switched positions; and (b) an adaptive Wiener filter having first means connected to said input for receiving said input signal and processing said input signal by reducing narrowband interference therein and for producing a processed input signal, second means connected to said input for receiving said input signal and producing an intermediate signal therefrom, third means connected to said first means and said second means for receiving said processed input signal and said intermediate signal and combining them together in order to reduce said interfering signal portion of said input signal and connected to said bypass switch for generate an output signal to said bypass switch, and fourth means connected to said second means and said third means for receiving said intermediate signal and said output signal and producing said control signal having a first state if said Wiener filter is successfully reducing said interfering signal portion and a second state if said Wiener filter is not successfully reducing said interfering signal portion; and (c) a bypass switch controller connected to said input, said Wiener filter, and said bypass switch, said bypass switch controller for receiving said control signal from said Wiener filter and for activating said bypass switch to said first or second switched position to correspondingly connect said Wiener filter in or out of said conducting path to said output depending upon whether said control signal is in said first or second state.

6. An adaptive processor for a spread spectrum receiver, said adaptive processor having an input and an output and a conducting path connecting said input and said output, said adaptive processor comprising:

(a) a bypass switch connected in said conducting path between said input and said output of said processor and having first and second switched positions; and (b) an adaptive limiter-canceller having first means connected to said input for receiving said input signal and processing said input signal by reducing narrowband interference therein and for producing a processed input signal, second means connected to said input for receiving said input signal and producing an intermediate signal therefrom, third means connected to said first means and said second means for receiving said processed input signal and said intermediate signal and combining them together in order to reduce said interfering signal portion of said input signal and connected to said bypass switch for generate an output signal to said bypass switch, and fourth means connected to said second means and said third means for receiving said intermediate signal and said output signal and producing said control signal having a first state if said limiter-canceller is successfully reducing said interfering signal portion and a second state if said limiter-canceller is not successfully reducing said interfering signal portion; and (c) a bypass switch controller connected to said input, said limiter-canceller, and said bypass switch, said bypass switch controller for receiving said control signal from said limiter-canceller and for activating said bypass switch to said first or second switched position to correspondingly connect said limiter-canceller in or out of said conducting path to said output depending upon whether said control signal is in said first or second state.

7. An adaptive processor for a spread spectrum receiver, said adaptive processor having an input and an output and a conducting path connecting said input and said output, said adaptive processor comprising:

(a) first and second bypass switches connected in series in said conducting path between said input and said output of said processor, each of said bypass switches having first and second switched positions;

(b) an adaptive Wiener filter connected between said input and said first bypass switch for receiving and processing an input signal which contains communicating and interfering signal portions and for outputting to said first bypass switch a signal having a reduced interfering portion, said Wiener filter also for producing a control signal having a first state if said interfering signal portion is being successfully reduced and a second state if said interfering signal portion is not being successfully reduced;

(c) a first bypass switch controller connected to said input, said Wiener filter, and said first bypass switch, said first bypass switch controller for receiving said control signal from said Wiener filter and for activating said first bypass switch to said first or second switched position to correspondingly connect said Wiener filter in or out of said conducting path to said second bypass switch depending upon whether said control signal is in said first or second state;

(d) an adaptive limiter-canceller connected to said input via said first bypass switch for receiving and processing an input signal which contains communicating and interfering signal portions and for outputting a signal with a reduced interfering portion, said limiter-canceller also for producing a control signal having a first state if said interfering signal portion is being successfully reduced and a second state if said interfering signal portion is not being successfully reduced; and (e) a second bypass switch controller connected to said second bypass switch, said limiter-canceller and said input via said first bypass switch and said first bypass switch controller, said second bypass switch controller for receiving said control signal from said limiter-canceller and for activating said second bypass switch to said first or second switched position to correspondingly connect said limiter-canceller in or out of said conducting path to said output depending upon whether said control signal is in said first or second state.

8. The processor of claim 7 wherein said first bypass switch controller is operable to activate said second bypass switch controller to cause the same to activate said second bypass switch to its second switched position for placing said limiter-canceller out of said primary signal conducting path if said Wiener filter is successfully cancelling the interfering signal portion.

9. The processor of claim 7 wherein said Wiener filter includes:

first means connected to said input for receiving said input signal and processing said input signal by reducing narrowband interference therein and for producing a processed input signal;

second means connected to said input for receiving said input signal and producing an intermediate signal therefrom;

third means connected to said first means and said second means for receiving said processed input signal and said intermediate signal and combining them together in order to reduce said interfering signal portion of said input signal and generate an output signal; and fourth means connected to said second means and said third means for receiving said intermediate signal and said output signal and producing said control signal.

10. The processor of claim 7 wherein said limiter-canceller includes:

first means connected to said input for receiving said input signal and processing said input signal by reducing narrowband interference therein and for producing a processed input signal;

second means connected to said input for receiving said input signal and producing an intermediate signal therefrom;

third means connected to said first means and said second means for receiving said processed input signal and said intermediate signal and combining them together in order to reduce said interfering signal portion of said input signal and generate an output signal; and fourth means connected to said second means and said third means for receiving said intermediate signal and said output signal and producing said control signal.

* * * * *